US008077883B2

(12) United States Patent
Cabot

(10) Patent No.: US 8,077,883 B2

(45) Date of Patent: Dec. 13, 2011

(54) INTELLIGENT SOLO-MUTE SWITCHING

(75) Inventor: Richard C. Cabot, Lake Oswego, OR (US)

(73) Assignee: XFRM Incorporated, Lake Oswego, OR (US)

( * ) Notice: Subject to any disclaimer, the term of this patent is extended or adjusted under 35 U.S.C. 154(b) by 1316 days.

(21) Appl. No.: 11/652,745

(22) Filed: Jan. 11, 2007

(65) Prior Publication Data

US 2008/0170726 A1 Jul. 17, 2008

(51) Int. Cl.
*H02B 1/00* (2006.01)

(52) U.S. Cl. ........................................................ 381/123

(58) Field of Classification Search ................. 381/94.1, 381/94.5, 94.7, 119, 123, 109; 330/51
See application file for complete search history.

(56) References Cited

U.S. PATENT DOCUMENTS

| | | | | |
|---|---|---|---|---|
| 4,941,187 | A | 7/1990 | Slater | |
| 5,299,266 | A | 3/1994 | Lumsden | |
| 5,479,519 | A | 12/1995 | Davis | |
| 5,554,895 | A * | 9/1996 | Ross et al. | 307/141 |
| 5,889,242 | A * | 3/1999 | Ishihara et al. | 200/6 A |
| 6,061,458 | A | 5/2000 | East et al. | |
| 6,434,242 | B2 | 8/2002 | Yamada et al. | |
| 6,839,441 | B1 | 1/2005 | Powers et al. | |
| 6,937,734 | B2 | 8/2005 | Abe et al. | |
| 7,542,814 | B2 * | 6/2009 | Barr | 700/94 |
| 2003/0076966 | A1 | 4/2003 | Okabayashi | |
| 2004/0013272 | A1 * | 1/2004 | Reams | 381/1 |

OTHER PUBLICATIONS

Photos of the EMT Franz A-400 mixer showing mechanical solo-mute toggle switch, obtained from eBay internet auction (item #7347098119).
Tascam, DS-M7.1 Owner's Manual, p. 21.
Grace Design, m906 Owner's Manual; p. 7.
RTW, SurroundControl Models 30900/30960 Data Sheet, p. 3.
Crane Song Ltd., Avocet Operator's Manual (rough draft), p. 7.
Alps, Two Detection Type Detector Switch (SSCF Series) Datasheet, p. 1.
Maxim, 2-Wire Interface Low-EMI Key Switch and Sounder Controllers, MAX7347/MAX7348/MAX7349 Datasheet, Apr. 2006, p. 1.
Alps, 4-directional TACT Switch with Center Push (SMD) Datasheet, SKRH series, p. 1.
Alps, Low-profile 4-directional TACT Switch with Center Push Datasheet, SKRV series, p. 1.

* cited by examiner

*Primary Examiner* — Vivian Chin
*Assistant Examiner* — Kile Blair
(74) *Attorney, Agent, or Firm* — Law Office of Karen Dana Oster, LLC

(57) ABSTRACT

An intelligent solo-mute switching system for an audio signal processing device having a plurality of channels. A plurality of multi-throw momentary switches are monitored by a switch interface to detect at least three switch events. A channel state controller responds to the at least three switch events detected by the switch interface in directing a channel gain matrix to govern the plurality of channels.

14 Claims, 5 Drawing Sheets

FIG. 4

$$\mathbf{y} = \mathbf{DCx}$$ 401

$$\mathbf{C} \equiv \begin{vmatrix} C_{0,0} & 0 & 0 & 0 & 0 & 0 \\ 0 & C_{1,1} & 0 & 0 & 0 & 0 \\ 0 & 0 & C_{2,2} & 0 & 0 & 0 \\ 0 & 0 & 0 & C_{3,3} & 0 & 0 \\ 0 & 0 & 0 & 0 & C_{4,4} & 0 \\ 0 & 0 & 0 & 0 & 0 & C_{5,5} \end{vmatrix}$$

402

$$\mathbf{y} = \begin{vmatrix} y_0 \\ y_1 \\ y_2 \\ y_3 \\ y_4 \\ y_5 \end{vmatrix}, \mathbf{x} = \begin{vmatrix} x_0 \\ x_1 \\ x_2 \\ x_3 \\ x_4 \\ x_5 \end{vmatrix}$$

404

403

INTELLIGENT SOLO-MUTE SWITCHING

BACKGROUND OF THE INVENTION

The present invention is generally related to audio signal processing devices. More particularly certain embodiments of the present invention relate to user interfaces for equipment used in the production and monitoring of surround audio programs.

In the early 1970's quadraphonic audio was introduced as the first commercialized surround audio reproduction system, but faded from the scene due to various technical difficulties and a lack of industry standardization on quadraphonic encoding formats. In more recent years however, surround audio production has made a comeback with the advent of digital audio codecs (e.g. AC-3, DTS) which allow a large number of audio channels to be stored or transmitted with high coding efficiency and with sufficiently good reproduction quality for theatre and home entertainment delivery. As a result of these technological advances and the ensuing demand for surround audio program material, there has been an increase in the diversity and availability of audio equipment specifically adapted for surround audio production applications.

In a surround audio recording or mixdown session, the layout and user interface of the associated production equipment makes a significant difference in the efficiency of the production process. A poorly thought-out design can seriously impede the smoothness and speed of normal audio production work, while a well-designed and intelligent user interface can help to make the work progress quickly and effortlessly. User interface design is a subtle art, and time-tested classic approaches do not always translate well to modern applications. Persons involved in the production of surround audio programs are constantly seeking to optimize productivity, and therefore there is an existing need to improve the user interface of surround audio production equipment.

Creating surround audio mixes has long been a standard practice for feature film productions and recently surround audio mixing has become more common in television and music production environments as well. In order to help engineers better ensure the quality and consistency of the resulting surround audio mixes, a special class of audio signal processing devices has emerged known as surround monitor controllers.

Among other functions, surround monitor controllers provide a means for the selection, combination and control of channels which carry surround audio from the outputs of the mixer to the control room monitor loudspeakers. Functions typically associated with each monitor channel include "solo" which selects a channel or group of channels exclusively for audible reproduction, and "mute" which excludes the muted channel from audible reproduction while leaving the other channels undisturbed. These functions have been inherited from the art of audio mixers (or "consoles") dating back to the earliest days of audio production.

The EMT-Franz's A-400 broadcast mixer had solo and mute functions combined on a simple mechanically latching toggle switch to be switched forward for solo and switched backward for mute. More typically solo and mute functions have been located separately on mechanically latching push-buttons, for example on vintage NEVE® and API® mixing consoles. Muting usually happens post-fader in the channel signal path, while solo may often be switchable between pre-fader and post-fader operation.

Some manufacturers of surround monitor controllers have sought to reduce the physical footprint and cost of their products by optimizing user interface features for the needs of surround monitoring applications. TASCAM® manufactures the DS-M7.1 Professional Digital Surround Monitor Controller, which features a single logic button for each monitor channel along with a "solo/mute" selector button, which modifies the function of all the channel buttons between solo and mute. Other surround monitor controllers, such as the Grace Design's m906 5.1 Monitor Controller and the RTW's SurroundControl series monitor controllers, employ a similar bimodal switching scheme. This approach requires the user to have constant knowledge of the "solo/mute" mode in order to use the channel buttons correctly. It is more desirable in the design of an effective user interface to avoid such bimodal switching schemes.

CRANE SONG LTD.® manufactures the Avocet Discrete Class A Studio Controller. The Avocet Discrete Class A Studio Controller also features a single button for each monitor channel. In normal operation the channel buttons are simple electronically latched "on-off" buttons which effectively perform the function of a conventional mute switch, but by holding a channel button for at least half a second the corresponding channel may be soloed in an electronically latching mode. In order to un-solo the channel, the button must be held again for at least half a second, at which point the channel reverts to the state it was prior to soloing. While the Avocet Discrete Class A Studio Controller avoids having an additional mode switching button to achieve solo-mute functionality, the user is still required to remember the button state for correct use, and there is also a significant time delay to engage and disengage solo. It is more desirable to provide an interface that avoids actuation time-delay.

U.S. Pat. No. 6,061,458 (East, et al.) discloses an audio mixing console with channel solo functions operable in several modes by electronically latching momentary logic buttons. Muting functions are located on separate user controls from solo functions. It is more desirable to provide a solo-mute switching apparatus which requires less physical space. US Published application 2003/0076966 (Okabayashi) discloses a digital mixer capable of monitoring surround signals. Mute and solo functions may be accessed through a surround monitor setting screen where first a channel is selected, and then a mode selection must be made. It is more desirable to provide a solo-mute switching apparatus which does not require multiple user actions or menus in order to engage or disengage channel solo.

In light of the prior art of audio signal processing devices and in particular surround monitor controllers, there is an outstanding need for a solo-mute switching apparatus that presents a simple, intuitive user interface. The solo-mute switching apparatus should minimize cost and space while avoiding bimodal buttons, actuation delay, menus and other undesirable user interface characteristics.

SUMMARY OF THE INVENTION

Preferred embodiments of the present invention provide an intelligent solo-mute switching system which is applicable to audio signal processing devices having a plurality of channels. A switch interface monitors a plurality of multi-throw momentary switches to detect at least three switch events substantially comprising solo, mute, and release. A channel state controller responds to the at least three switch events in directing a channel gain matrix to govern the plurality of channels. Preferred embodiments of the present invention will minimize space and cost while avoiding bimodal buttons, actuation delay, menus and other undesirable user interface characteristics.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 shows the mathematical configuration of the channel gain matrix according to a digital surround monitor controller embodiment of the present invention.

DETAILED DESCRIPTION OF THE INVENTION

The present invention provides an intelligent solo-mute switching system applicable to audio signal processing devices. A preferred embodiment of the present invention is presented in the context of an improved user interface for a surround monitor controller.

Figure 1:
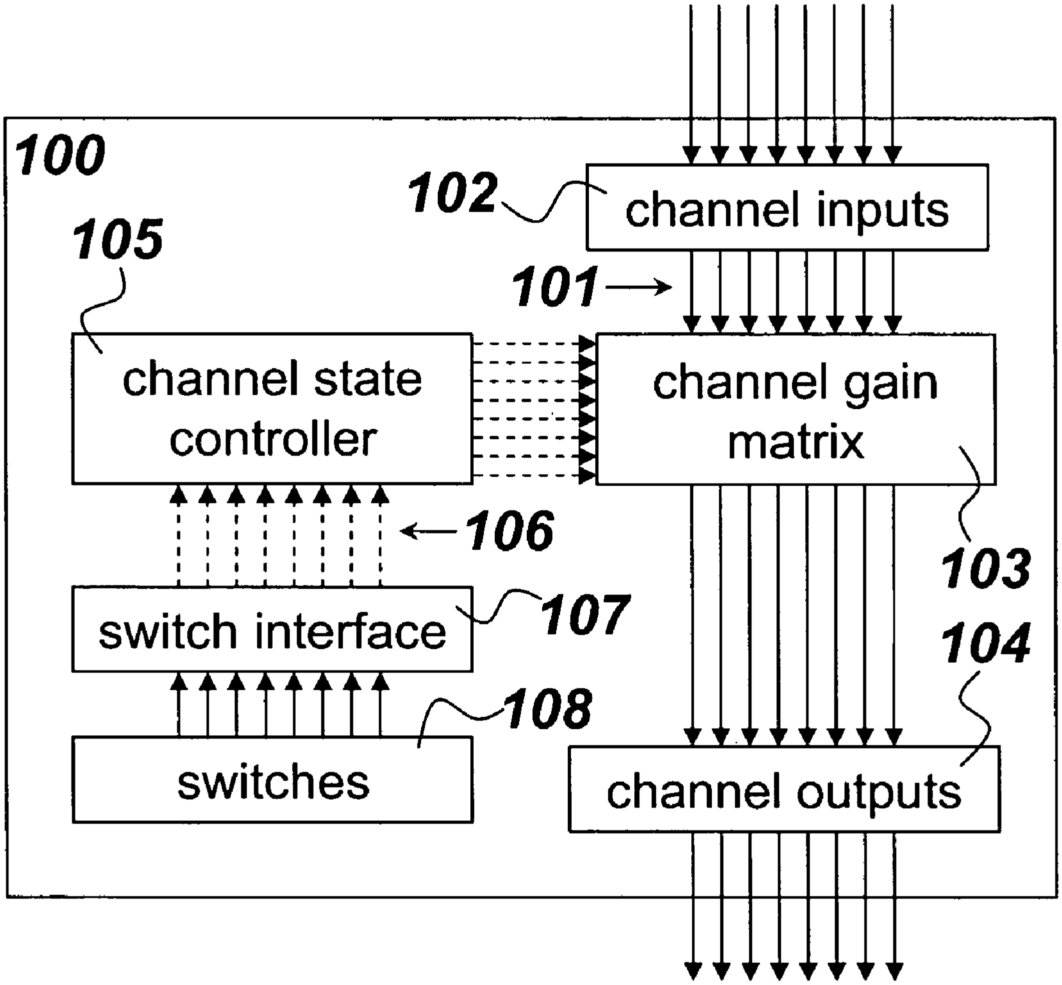
FIG. 1 is a simplified signal flow diagram of a preferred surround monitor controller embodiment of the present invention.

FIG. 1 is a simplified signal flow diagram of a preferred surround monitor controller embodiment 100 of the present invention. A plurality of channels 101 received by the channel inputs 102 carry audio signals and a channel gain matrix 103 is configured to govern the plurality of channels 101. The output from the channel gain matrix 103 is delivered to the monitor speakers via the channel outputs 104. The channel gain matrix 103 may be used to implement solo and muting functions. The channel gain matrix 103 also may be used to create linear combinations of the plurality of channels 101 in order to down-mix a surround audio signal to a reproduction format with fewer audio channels (e.g. LCR, LR, mono).

A simplified channel gain matrix according to the present invention may contain only "diagonal" matrix components and would therefore have no down-mix capability, but could still control the gain on each channel. This limited functionality could be equivalently implemented by gain elements placed in the path of each channel for basic solo-mute operation where no channel mixing is required. In the claims that follow the words "channel gain matrix" should be construed to include all equivalent analog and digital embodiments of that element. Where channel gain or overall system gain is implemented apart from channel solo and mute functions "channel gain matrix" should be construed to include elements which simply pass or block audio signals in the plurality of channels 101.

The channel gain matrix 103 is directed by the channel state controller 105. The channel state controller is responsive to switch events 106 detected by the switch interface 107 in the plurality of multi-throw momentary switches 108. Multi-throw momentary switches have a resting position and at least two user-actuated positions. A suitable multi-throw switch is the Alps Electric Co., LTD.'s SSCF series momentary double-throw toggle switch. In a preferred surround monitor controller embodiment, one multi-throw momentary switch may be provided for each audio channel to be governed by the channel gain matrix 103. The MAX7349 key switch controller (produced by Maxim Integrated Products, Inc.) is a suitable part for the switch interface 107, and the practice of detecting and reporting switch events 106 using parts, such as MAX7349 key switch controller (produced by Maxim Integrated Products, Inc.), is well-known in the art of audio signal processing devices.

Figure 2:
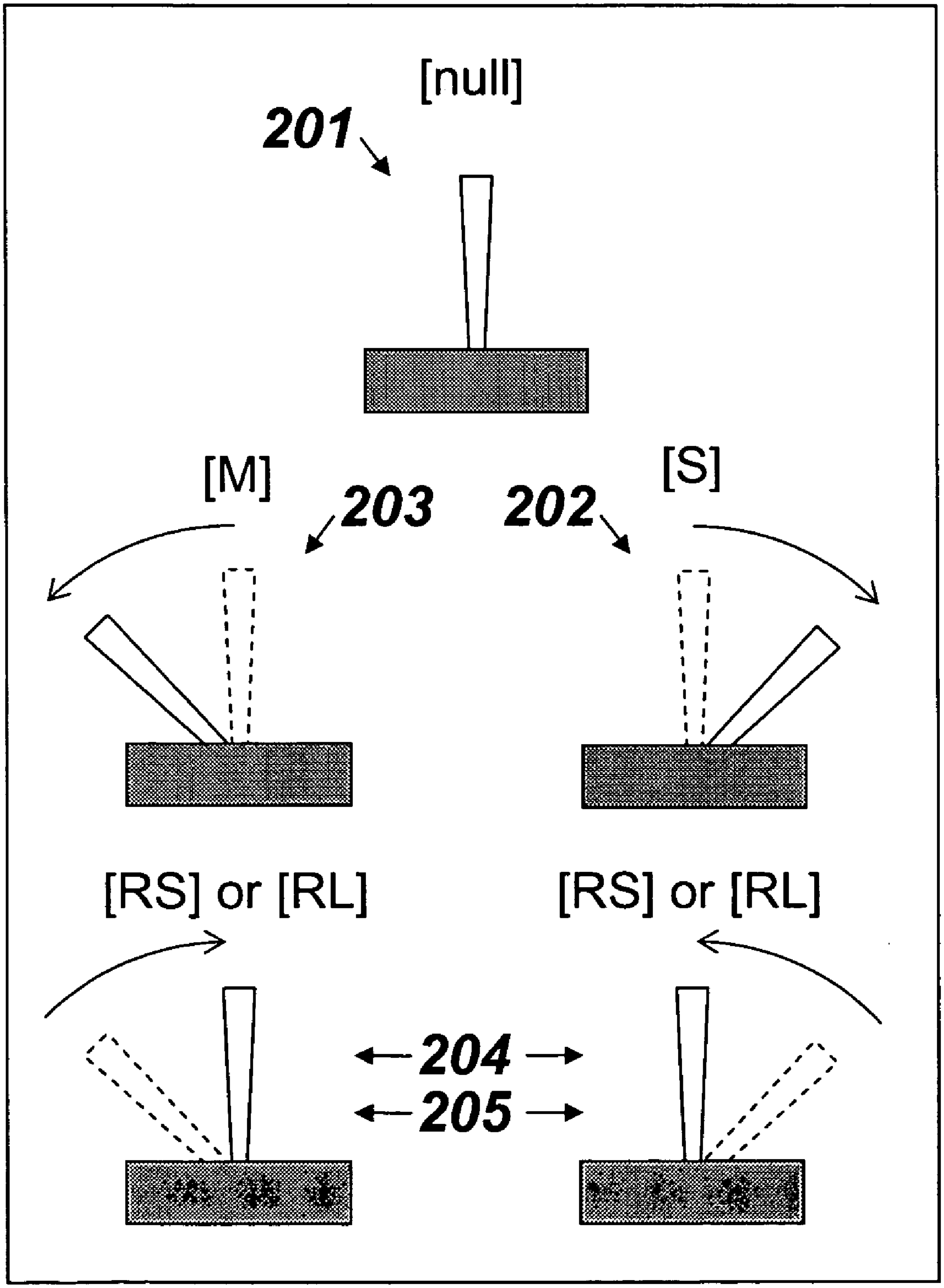
FIG. 2 shows switch events as detected in the plurality of multi-throw momentary switches according to a surround monitor controller embodiment of the present invention.

FIG. 2 shows switch events 106 as detected from the plurality of multi-throw momentary switches 108 by the switch interface 107 according to a surround monitor controller embodiment of the present invention. Using a multi-throw momentary switch there are at least four distinct detectable switch events. When the switch is in its center-off resting position this is the [null] event 201. When the switch is pressed in the direction indicated for channel solo this is immediately reported by the switch interface 107 to the channel state controller 105 as a solo event [S] 202. When the switch is pushed in the opposite direction of channel solo, which is indicated for channel mute, this is immediately reported as a mute event [M] 203.

When the switch is released from either direction this is immediately reported by the switch interface 107 to the channel state controller 105 as a release short event [RS] 204 or release long event [RL] 205 depending on the elapsed time between the initial switch actuation and subsequent release. Note that it is not necessary to specify the direction from which the switch has been released as a distinct event, only that a release has occurred and whether or not the switch was held longer than a pre-defined release-threshold time. A suitable release-threshold time for distinguishing between a release short event [RS] 204 or release long event [RL] 205 would be 500 milliseconds.

Figure 3:
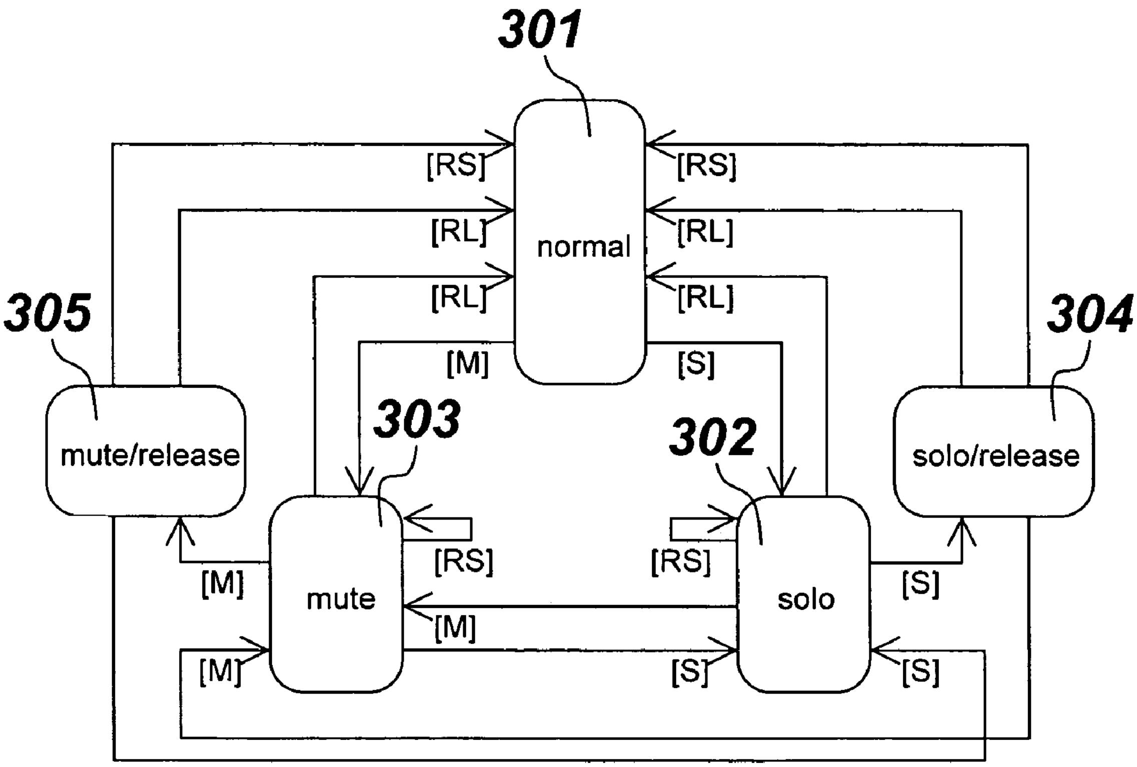
FIG. 3 is a state diagram for a single channel as implemented in the channel state controller according to a surround monitor controller embodiment of the present invention.

FIG. 3 is a state diagram for a single channel as implemented in the channel state controller 105 which is responsive to the switch interface 107 according to a surround monitor controller embodiment of the present invention. The state diagram shown here is independently implemented for each channel. In other words, there is a "one to one" correspondence between each of the plurality of multi-throw switches 108 and the plurality of channels 101 governed by the channel gain matrix 103 as directed by the channel state controller 105 in response to switch events 106. The normal state 301 is the default starting point for each channel. A solo event [S] 202 will cause immediate transition to the solo state 302, and likewise a mute event [M] 203 will cause immediate transition to the mute state 303.

From the solo state 302, a release short [RS] 204 will remain in the solo state 302, while a release long [RL] 205 will cause reversion to the normal state 301. Similarly from the mute state 303, a release short [RS] 204 will remain in the mute state 303, while a release long [RL] 205 will cause reversion to the normal state 301. So if the switch is held past the release-threshold time, the channel will immediately return to the normal state 301 upon release, and otherwise latches appropriately into either the solo state 302 or mute state 303. From the solo state 302 another solo event [S] 202 causes a transition to the solo/release state 304, and either release short [RS] 204 or release long [RL] 205 events will then result in going back into the normal state 301. In a symmetrical fashion, from the mute state 303 an additional mute event [M] 203 causes a transition to the mute/release state 305, and either release short [RS] 204 or release long [RL] 205 events will result in going back to the normal state

301. From the mute state, a solo event [S] 202 causes direct transition to the solo state 302, and symmetrically from the solo state a mute event [M] 203 causes direct transition to the mute state 303.

Direct cross-transitions from the solo/release state 304 to the mute state 303, or from the mute/release state 305 to the solo state 302 may need to be handled if the switches and switch interface employed can mechanically or electrically allow a solo event [S] 202 to directly follow a mute event [M] 203 and vice versa without detecting an intervening release short event [RS] 204 or release long event [RL] 205. This could happen because of a long switch debouncing time, or if a multi-throw momentary switch with small resting position contact area is used.

FIG. 4 illustrates the mathematical implementation of the channel gain matrix 103 according to a digital surround monitor controller embodiment of the present invention. The channel gain matrix equation 401 states that a vector of input samples x 403 is first multiplied by a solo-mute matrix C 402 and then by a down-mix matrix D to produce a vector of output samples y 404. Therefore the channel gain matrix may be written as the matrix product of D and C. The down-mix matrix D is not shown, and in the absence of down-mix requirements D may be omitted altogether. To perform down-mixing before solo-mute operations, the multiplicative order of matrices D and C is reversed. In the solo-mute matrix 402 only the diagonal elements are non-zero, since the function of the solo-mute matrix 402 is merely to select input samples x 403 to pass to the output y 404, and not to transform or combine channels.

The following code example in the "C" programming language shows how to derive the solo-mute matrix C 402 (in the channel gain matrix equation shown in FIG. 4) from the states of each channel in the channel state controller 105. Off-diagonal matrix components are assumed to be zero, and therefore only the diagonal components are dealt with here. For those less familiar with the details of "C" syntax the symbol "^" denotes a logical OR, and "C[k,k]" refers to the matrix element $C_{k,k}$.

CODE EXAMPLE 1

```
int i, j;
int SOLO_EXISTS = 0;
/* check if any channels are soloed */
for (i = 0; i < NUM_CHANS; i++)
   if ((channel_state[i] == SOLO) ^ (channel_state[i] ==
   SOLO_RELEASE))
      SOLO_EXISTS = 1;
/* map channel states to solo-mute matrix */
for (k = 0; k < NUM_CHANS; k++)
{
   switch (channel_state[k])
   {
      case SOLO              : C[k,k] = 1;
      case SOLO_RELEASE      : C[k,k] = 1;
      case MUTE              : C[k,k] = 0;
      case MUTE_RELEASE      : C[k,k] = 0;
      default                : /* channel_state[k] must be NORMAL */
      {
         if (SOLO_EXISTS)
            C[k,k] = 0;
         else
            C[k,k] = 1;
      }
   }
}
```

The user interface of the present invention as generally described above and shown in FIGS. 1-4 has several advantages over the prior art of solo-mute switching. The user has the option to hold the multi-throw switch towards either desired function past the release-threshold time, and upon release the channel will return immediately to the normal state. This allows a "quick preview" functionality without latching, while a simple quick press and release will effect electronic latching or unlatching. In both cases there is no actuation delay associated with activating either the solo or mute functions. Bimodal switches or menus are not required, and space and cost requirements are minimized by combining multiple functions onto a single control.

Figure 5:
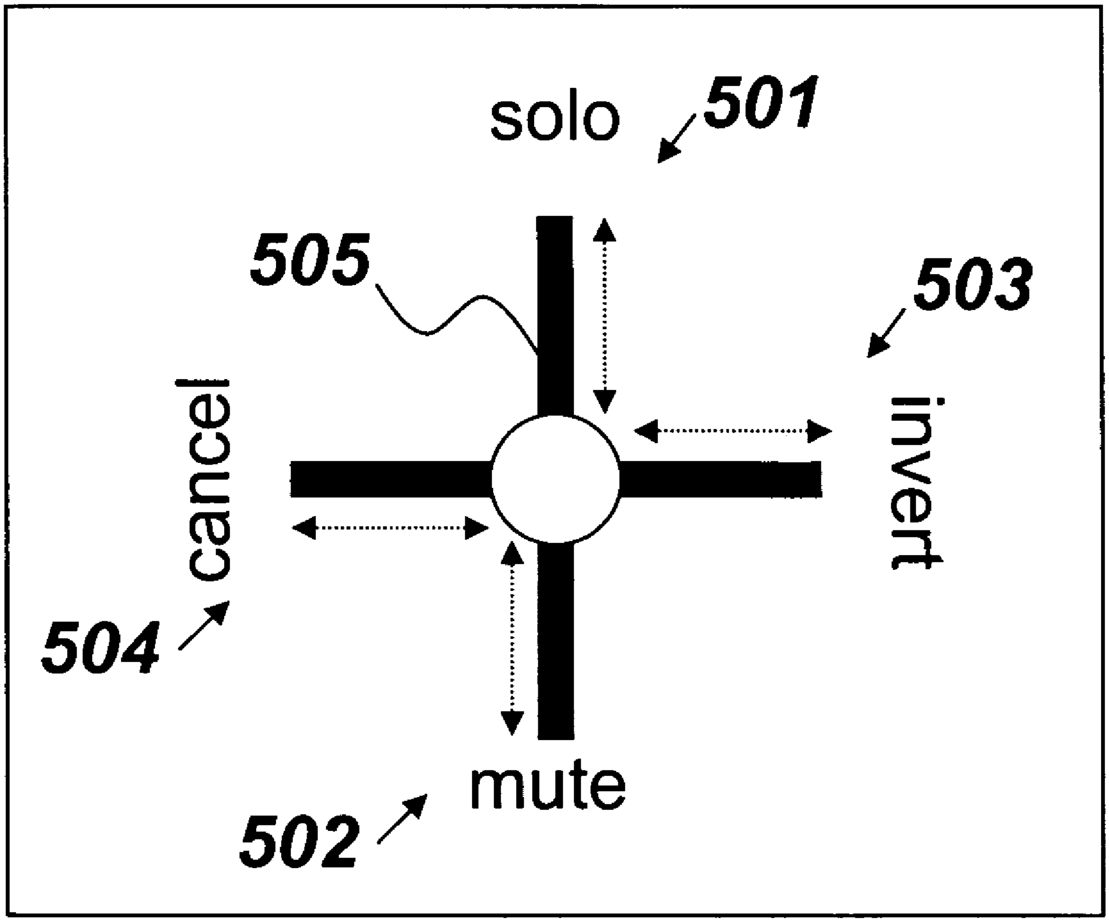
FIG. 5 is a top view of a four-directional switch which implements solo-mute switching and additional functions on a single control.

In other embodiments of the present invention, the plurality of multi-throw momentary switches 108 may each have more than two actuated positions in order to combine additional functions onto a single control. FIG. 5 is a top view of a four-directional switch which implements solo-mute switching and additional functions on a single control. Alps Electric Co., LTD. manufactures several parts suitable for this application including the SKRH and SKRV series four-directional TACT switches. Some multi-directional switches permit off-axis motion in any direction, in which case addition of a mechanical constraint (e.g. shaped panel cutout) to the desired actuation pattern 505 may be necessary.

Additional combined functions may include "solo" 501 and "mute" 502 along with the addition of "invert" 503 and "cancel" 504. Moving the switch 500 towards "invert" 503 would simply flip the sign of the appropriate diagonal element $C_{k,k}$ of the solo-mute matrix 402 and thereby invert the polarity of the corresponding audio channel. If "cancel" 504 is selected instead, then soloing, muting and polarity inversion for the channel would be instantly defeated. Such additional combined functions may be implemented with a release-time threshold and electronically latching states similarly to the solo-mute switching functions as described above and shown in the state diagram of FIG. 3. In a four-directional switch embodiment at least five switch events must be detected by the switch interface, corresponding to each of the four switch functions and a "release" event. If implementing a release-time threshold in a four-direction embodiment the "release" event may be divided into distinct "release short" and "release long" events as shown in FIGS. 2-3 for a basic solo-mute embodiment. Additional embodiments may incorporate different combined functions than those shown in FIG. 5 in keeping with the spirit and scope of the claimed invention.

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. An intelligent solo-mute switching system for an audio signal processing device having a plurality of channels comprising:

a plurality of multi-throw momentary switches, a switch interface, a channel state controller, and a channel gain matrix;

wherein each of said plurality of multi-throw momentary switches is assigned to one of said plurality of channels to control a normal, solo, and mute function of the assigned channel;

wherein said switch interface monitors each of said plurality of multi-throw momentary switches to detect at least four switch events of each switch substantially comprising a solo event, a mute event, a release short event, and a release long event;

wherein a release short event occurs when a switch is released subsequent to being actuated and held for less than a pre-defined release-threshold time and a release long event occurs when a switch is released subsequent to being actuated and held for longer than said pre-defined release-threshold time;

wherein said channel state controller responds to said switch events in directing said channel gain matrix to govern the plurality of channels;

wherein said channel state controller responds to said solo event of each of said switches by directing said channel gain matrix to govern the channel, to which each of said switches is respectively assigned, by a solo function;

wherein said channel state controller responds to said mute event of each of said switches by directing said channel gain matrix to govern the channel, to which each of said switches is respectively assigned, by a mute function;

wherein said channel state controller responds to said release short event of each of said switches by directing said channel gain matrix to govern the channel, to which each of said switches is respectively assigned by the same function as the function that governs the channel at the time of the release short event, if the channel was governed by a normal function at the time of the actuation;

wherein said channel state controller responds to said release short event of each of said switches by directing said channel gain matrix to govern the channel, to which each of said switches is respectively assigned, by the normal function if the channel was governed, at the time of the actuation, by the same function that governs the channel at the time of the release short event; and wherein said channel state controller responds to said release long event of each of said switches by directing said channel gain matrix to govern the channel, to which each of said switches is respectively assigned, by the normal function.

2. The intelligent solo-mute switching system of claim 1 wherein the audio signal processing device having a plurality of channels is configurable to receive digital audio signals.

3. The intelligent solo-mute switching system of claim 1 wherein the audio signal device is a surround monitor controller.

4. The intelligent solo-mute switching system of claim 1 wherein each of said plurality of multi-throw momentary switches is further assigned to one of said plurality of channels to control an invert function, and wherein said channel state controller responds to an invert event of each of said switches by directing said channel gain matrix to govern the channel, to which each of said switches is respectively assigned, by an invert function.

5. The intelligent solo-mute switching system of claim 1 wherein each of said plurality of multi-throw momentary switches is further assigned to one of said plurality of channels to control a cancel function, and wherein said channel state controller responds to a cancel event of each of said switches by directing said channel gain matrix to govern the channel, to which each of said switches is respectively assigned, by a cancel function.

6. The intelligent solo-mute switching system of claim 1 wherein each of said plurality of multi-throw momentary switches is further assigned to one of said plurality of channels to control an invert function and a cancel function, wherein said channel state controller responds to an invert event of each of said switches by directing said channel gain matrix to govern the channel, to which each of said switches is respectively assigned, by an invert function, and wherein said channel state controller responds to a cancel event of each of said switches by directing said channel gain matrix to govern the channel, to which each of said switches is respectively assigned, by a cancel function.

7. An intelligent switching system for an audio signal processing device having a plurality of channels comprising:

a plurality of multi-directional momentary switches, a switch interface, a channel state controller, and a channel gain matrix;

wherein each of said plurality of multi-directional momentary switches is assigned to one of said plurality of channels to control a function of the assigned channel;

wherein said switch interface monitors each of said plurality of momentary multi-directional switches to detect at least three switch events of each switch, the at least three switch events selected from the group consisting of a solo event, a mute event, an invert event, a cancel event, a release short event, and a release long event;

wherein said release short event occurs when a switch is released subsequent to being actuated and held for less than a pre-defined release-threshold time and said release long event occurs when a switch is released subsequent to being actuated and held for longer than said pre-defined release-threshold time;

wherein said channel state controller responds to said switch events in directing said channel gain matrix to govern the plurality of channels;

wherein said channel state controller responds to said solo event of each of said switches by directing said channel gain matrix to govern the channel, to which each of said switches is respectively assigned, by a solo function;

wherein said channel state controller responds to said mute event of each of said switches by directing said channel gain matrix to govern the channel, to which each of said switches is respectively assigned, by a mute function;

wherein said channel state controller responds to said invert event of each of said switches by directing said channel gain matrix to govern the channel, to which each of said switches is respectively assigned, by an invert function;

wherein said channel state controller responds to said cancel event of each of said switches by directing said channel gain matrix to govern the channel, to which each of said switches is respectively assigned, by a cancel function;

wherein said channel state controller responds to said release short event of each of said switches by directing said channel gain matrix to govern the channel, to which each of said switches is respectively assigned, by the same function as the function that governs the channel at the time of the release short event, if the channel was governed by a normal function at the time of the actuation;

wherein said channel state controller responds to said release short event of each of said switches by directing said channel gain matrix to govern the channel, to which each of said switches is respectively assigned, by the normal function if the channel was governed, at the time of the actuation, by the same function that governs the channel at the time of the release short event; and wherein said channel state controller responds to said release long event of each of said switches by directing said channel gain matrix to govern the channel, to which each of said switches is respectively assigned, by the normal function.

8. The intelligent switching system of claim 7 wherein each of said plurality of multi-directional switches is mechanically constrained to a desired actuation pattern.

9. The intelligent switching system of claim 7 wherein the audio signal processing device is a surround monitor controller.

10. The intelligent switching system of claim 7 wherein said switch interface monitors each of said plurality of momentary multi-directional switches to detect at least four switch events of each switch, the at least four switch events selected from the group consisting of a solo event, a mute event, an invert event, a cancel event, a release short event, and a release long event.

11. The intelligent switching system of claim 7 wherein said switch interface monitors each of said plurality of momentary multi-directional switches to detect at least five switch events of each switch, the at least five switch events selected from the group consisting of a solo event, a mute event, an invert event, a cancel event, a release short event, and a release long event.

12. An intelligent switching system for an audio signal processing device having a plurality of channels comprising:

a plurality of multi-throw momentary switches, a switch interface, a channel state controller, and a channel gain matrix;

wherein each of said plurality of multi-throw momentary switches is assigned to one of said plurality of channels to control the gain of the assigned channel;

wherein said switch interface monitors each of said plurality of momentary multi-throw switches to detect at least two switch events of each switch substantially comprising a release short event and a release long event;

wherein said release short event occurs when a switch is released subsequent to being actuated and held for less than a pre-defined release-threshold time and said release long event occurs when a switch is released subsequent to being actuated and held for longer than said pre-defined release-threshold time;

wherein said channel state controller responds to said switch events in directing said channel gain matrix to govern the plurality of channels;

wherein said channel state controller responds to said release short event of each of said switches by directing said channel gain matrix to govern the channel, to which each of said switches is respectively assigned, by the same function as the function that governs the channel at the time of the release short event, if the channel was governed by a normal function at the time of the actuation;

wherein said channel state controller responds to said release short event of each of said switches by directing said channel gain matrix to govern the channel, to which each of said switches is respectively assigned, by the normal function if the channel was governed, at the time of the actuation, by the same function that governs the channel at the time of the release short event; and wherein said channel state controller responds to said release long event of each of said switches by directing said channel gain matrix to govern the channel, to which each of said switches is respectively assigned, by the normal function.

13. The intelligent switching system of claim 12 wherein each of said plurality of multi-throw switches is mechanically constrained to a four-directional actuation pattern.

14. The intelligent switching system of claim 12 wherein the set gain comprises at least one of said normal state, a solo state, a mute state, an invert state, and a cancel state.

* * * * *